(12) United States Patent
Coffey

(10) Patent No.: US 6,930,860 B1
(45) Date of Patent: Aug. 16, 2005

(54) MICRO-FLEXURE SUSPENSION INCLUDING PIEZOELECTRIC ELEMENTS FOR SECONDARY ACTUATION

(75) Inventor: Jerry T. Coffey, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 172 days.

(21) Appl. No.: 10/365,184

(22) Filed: Feb. 11, 2003

Related U.S. Application Data

(60) Provisional application No. 60/356,927, filed on Feb. 12, 2002.

(51) Int. Cl.[7] .............................. G11B 5/55; G11B 5/60
(52) U.S. Cl. ................................ 360/294.4; 360/245.3
(58) Field of Search ........................ 360/294.1, 294.2, 360/294.3, 294.4, 245.3, 234.6

(56) References Cited

U.S. PATENT DOCUMENTS

| | | | |
|---|---|---|---|
| 5,657,188 A | 8/1997 | Jurgenson et al. ........... 360/106 |
| 5,862,015 A | 1/1999 | Evans et al. ................. 360/104 |
| 6,002,549 A * | 12/1999 | Berman et al. ........... 360/294.4 |
| 6,239,947 B1 | 5/2001 | Fan et al. .................... 360/104 |
| 6,246,552 B1 * | 6/2001 | Soeno et al. ............. 360/294.4 |
| 6,320,730 B1 * | 11/2001 | Stefansky et al. ........ 360/294.4 |
| 6,381,104 B1 * | 4/2002 | Soeno et al. ............. 360/294.4 |
| 6,404,600 B1 | 6/2002 | Hawwa et al. ........... 360/294.4 |
| 6,538,854 B2 * | 3/2003 | Koganezawa et al. ... 360/294.4 |
| 6,671,131 B2 * | 12/2003 | Kasajima et al. ........ 360/294.4 |
| 6,700,749 B2 * | 3/2004 | Shiraishi et al. ......... 360/294.4 |
| 6,747,848 B2 * | 6/2004 | Kasajima et al. ........ 360/245.3 |
| 6,775,107 B2 * | 8/2004 | Kasajima et al. ........ 360/294.4 |

* cited by examiner

*Primary Examiner*—Jefferson Evans
(74) *Attorney, Agent, or Firm*—Sheridan Ross P.C.

(57) ABSTRACT

A micro-flexure is provided for achieving secondary actuation in an actuator of a disk drive. The micro-flexure is a separate element which attaches to a standard flexure. A slider mounts to the micro-flexure. Piezoelectric elements attach to the micro-flexure to provide the motive force for displacing the micro-flexure during secondary actuation. The secondary actuation is thereby achieved by isolating movement at the slider.

27 Claims, 5 Drawing Sheets

MICRO-FLEXURE SUSPENSION INCLUDING PIEZOELECTRIC ELEMENTS FOR SECONDARY ACTUATION

CROSS REFERENCE TO RELATED APPLICATIONS

Priority is claimed from U.S. Provisional Patent Application Ser. No. 60/356,927, filed on Feb. 12, 2002, and entitled "MICRO-FLEXURE SUSPENSION DESIGN" and further identified as the disclosure of which is incorporated herein by reference in its entirety.

FIELD OF THE INVENTION

The present invention relates to actuators used in disk drives, and more particularly, to a micro-flexure suspension which provides secondary actuation thereby achieving finer head positioning.

BACKGROUND OF THE INVENTION

Computer disk drives typically incorporate retrieval and storage of data by use of magnetic storage disks and read/write heads which are capable of reading data from and writing data onto the rotating storage disks. Data is stored on each magnetic storage disk in a number of concentric tracks on the disk. The narrower the tracks can be made, the more data which can be stored on the storage disk. The read/write heads may also be referred to as the read/write transducers which are integrated within a slider which typically places the heads at a predetermined height above the corresponding storage disk. One or more read/write heads may be integrated within a single slider. A suspension assembly supports the slider over the disk and maintains the slider over the desired data track center line during a read or write operation. A cushion of air is generated between the slider and the rotating disk, the cushion often referred to as an air bearing. The suspension assembly is part of the actuator which is the component in the disk drive for positioning the read/write heads. The actuator is typically controlled by a voice coil motor which acts as a primary actuator for positioning of the slider over the desired track. Because of the trend in recent years to provide greater storage capacity on a storage disk, track widths have become increasingly narrower which makes it more difficult for the read/write heads to accurately read and write information to and from the magnetic disks. The actuator has limited ability to accurately position a slider across the data tracks. Accordingly, a need has arisen over the years for the ability to more accurately position the read/write heads on tracks of decreasing width. As track density increases, the speed or servo bandwidth with which an actuator can respond must also increase to allow effective track following.

One approach to achieving finer positioning of the actuator is to employ secondary actuation that operates together with primary actuation provided by the voice coil motor. Secondary actuation can be provided in the form of an additional actuator control element which provides for finer control of the flexure and/or load beam. These additional control elements have often been termed "micro" or "milli" actuators.

It is known to utilize piezoelectric materials to achieve secondary actuation in a milli-actuator. The U.S. Pat. No. 6,404,600 discloses a prior art milli-actuator which may utilize two piezoelectric actuators mounted between the base plate of an actuator arm and load beam of an actuator. A narrowed section may be provided between the base plate and load beam, or the base plate and load beam may be physically separated. The piezoelectric elements act in a "push-pull" manner to move the load beam relative to the base plate. The distal end of the load beam carries the flexure and slider. Secondary actuation is therefore achieved by movement of the load beam which in turn moves the flexure and slider. This reference also discloses a pair of bimorph-actuators which are deflectable together in a common direction and which interconnect an inboard portion and an outboard portion of an actuator arm. Upon deflection of the bimorph-actuators in the same direction, the outboard portion of the actuator arm is translated along a path that is transverse to the longitudinal axis of the inboard portion. This transverse motion results in secondary actuation and further allows the read/write head to be kept substantially within a plane parallel to the surface of the data storage disk thereby preventing potential damage caused by possible contact between the slider and the disk surface.

Another reference disclosing a means of secondary actuation is the invention disclosed in U.S. Pat. No. 6,239,947. This reference teaches a milli-actuator having an integrated milli-actuator/electronics module which is positioned between the suspension of an actuator arm and the slider. The milli-actuator is an electrostatic rotary device in which a rotor structure is controllably rotated by the electronics module to provide the secondary actuation. Integration of the milli-actuator electronics with the milli-actuator reduces parasitic loading and interference problems with magnetic transducer signals.

Yet another example of a reference disclosing secondary actuation is the U.S. Pat. No. 5,657,188. In this reference, a micro-actuator is located on the load beam which controls movement of the flexure and the read/write heads attached to the flexure thereby achieving greater positional control of the read/write head on a desired disk track. The micro-actuator includes a moving pole member mounted to the flexure, a stationary pole member mounted to a rigid region on the load beam adjacent to the moving pole, and coils positioned around the stationary pole member.

While the above inventions may be adequate for their intended purposes, one particular drawback to previous micro/milli-actuator designs is that the secondary actuator mechanism actuates not only the slider, but also the load beam and/or the flexure. With the micro-flexure suspension of the present invention, only the slider is moved. The isolation of movement at the slider lowers the moving mass of secondary actuation, reduces windage excitation, and improves overall dynamic performance of the actuator. Windage excitation refers to some increase in loss of control over the read/write heads due to an increase in uncontrolled movement of the suspension due to airflow forces acting upon the suspension during operation. Incorporating a micro-actuator across the load beam and/or flexure may reduce the stiffness of the load beam and flexure and may contribute to uncontrolled suspension movement. Accordingly, any gain in fine positioning of the actuator by use of a micro-actuator may be lost by inability to minimize windage excitation.

Therefore, it can be seen that there is a need to provide secondary actuation, but to limit the structure which is secondarily actuated by targeting the structure in the suspension in closest proximity to the read/write heads.

SUMMARY OF THE INVENTION

In accordance with the present invention, a micro-flexure suspension is provided for secondary actuation. The micro-flexure suspension overcomes the shortcomings of the prior art mentioned above regarding secondary actuation of the load beam and flexure which can be negatively impacted by windage excitation. More specifically, the present invention provides a micro-flexure suspension which only actuates the slider and not the flexure or load beam.

Therefore, one advantage of the present invention is that the mass and size of the elements which are moved in secondary actuation is reduced, thereby improving dynamics and reducing windage excitation.

Another advantage of the present invention is that since the micro-flexure suspension is a separate element which is attached directly to a flexure of standard design, there is no requirement to alter many of the basic design or manufacturing processes for making the flexure or load beam. Accordingly, the micro-flexure suspension of the present invention can be incorporated within current actuator designs minimizing new efforts in design and manufacturing.

Yet another advantage of the present invention is that although precise secondary actuation control is provided, this is not achieved with any sacrifice in the flight characteristics of the slider and flexure because the micro-actuator has a reinforced construction to inhibit undesirable vertical/perpendicular movement of the flexure with respect to the micro-flexure thereby maintaining gimballing stiffness of the flexure.

The present invention provides a micro-flexure which attaches directly to a standard flexure, and the slider directly attaches to the micro-flexure. Coarse positioning of the actuator is achieved in the conventional manner as by a voice coil motor. Secondary actuation is achieved by movement of the slider on the micro-flexure by use of piezoelectric elements which are capable of imparting movement on the micro-flexure in relatively small but precise displacements. The micro-flexure is designed such that movement imparted to the slider is achieved in a plane parallel to the plane of the magnetic storage disk surface, and out of plane movements are minimized by a pair of reinforcing legs which provide the stiffness to resist such out of plane movements.

More specifically, the micro-flexure includes a base section and a tongue section extending from the base section, both sections being offset from the standard flexure to prevent contact between the sections and the standard flexure. The base and tongue sections may be collectively referred to as a slider carrying section because the base and tongue sections are integrally formed, and the slider is attached to and supported by both the base and tongue sections. A transverse support integral with the micro-flexure attaches the micro-flexure element to the standard flexure. The pair of reinforcing legs are positioned on opposite lateral sides of the micro-flexure and extend in a direction substantially parallel to one another along a longitudinal axis of the actuator. The reinforcing legs provide not only stiffening support to the micro-flexure, but also facilitate controllable transverse movement of the micro-flexure during secondary actuation. A piezoelectric element is attached to each of the reinforcing legs. A cut-out or gap is formed in the micro-flexure adjacent the reinforcing legs and the transverse support, thereby allowing the tongue section to hang unsupported except for a connected end of the tongue section which transitions into the base section. Preferably, this cut out is u-shaped, and the peripheral edges of the tongue are thereby bounded by the cut out or gap. The slider is attached to the tongue and base sections. Application of a desired voltage to the piezoelectric elements results in elastic deformation of the reinforcing legs thereby laterally shifting or deflecting the base and tongue sections of the micro-flexure, thereby also shifting the attached slider. Movement of the slider during secondary actuation is along a path which is lateral or transverse to the longitudinal axis of the actuator arm. This transverse motion allows the read/write head to be precisely positioned while also maintaining the slider within a plane parallel to the surface of the storage disk thereby minimizing out of plane motion. During secondary actuation, the gap surrounding the tongue section allows movement of the slider without any interfering contact with the standard flexure, load beam, or any other portions of the micro-flexure.

In one aspect of the present invention, it can be considered an improved suspension assembly including the load beam, standard flexure and the micro-flexure mounted to the standard flexure. In another aspect of the invention, it may further include the slider in combination with the suspension assembly. In yet another aspect of the present invention, it can be considered as only including the micro-flexure, and not in combination with the standard flexure, load beam or slider.

Also according to the present invention, a method is provided for secondary actuation of an actuator of a disk drive. The method contemplates provision of an actuator, attaching a micro-flexure to the standard flexure of the actuator, providing at least one piezoelectric element attached to the micro-flexure, and then applying a desired voltage to the piezoelectric element to place a bending moment upon the micro-flexure thereby shifting or translating the micro-flexure to achieve desired secondary actuation.

Structurally, the micro-flexure can also be described in terms of a stationary portion which attaches to the standard flexure, and a movable portion which is offset from the standard flexure and is spaced from the stationary portion. The stationary portion includes the transverse support, and the movable portion includes the area of the reinforcing legs in contact with the piezoelectric elements, as well as the tongue and base sections. The movable portion is spaced from the stationary portion by the gap which surrounds the peripheral edge of the tongue section. The offset arrangement between the movable portion and standard flexure, and the gap surrounding the peripheral edge of the tongue section thereby provide clearance for secondary actuation.

Additional advantages and features of the present invention will become apparent by review of the following written description taken in conjunction with the accompanying drawings.

DETAILED DESCRIPTION

Figure 1:
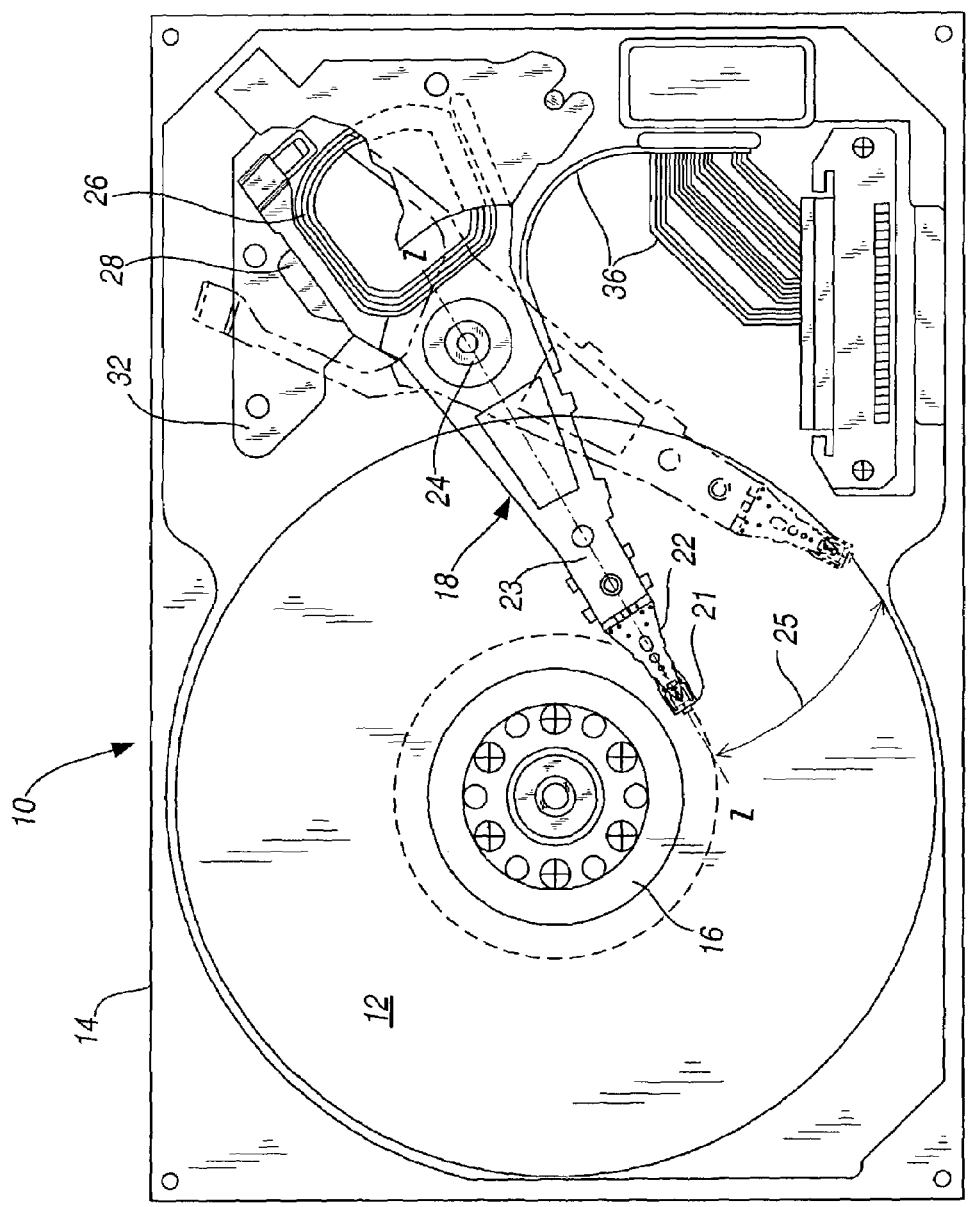
FIG. 1 is a simplified plan view of a standard computer disk drive including an actuator for positioning of a slider on a magnetic storage disk.

FIG. 1 shows a plan view of a standard disk drive assembly 10 with the top cover removed. FIG. 1 is representative of any number of common disk drives. The disk drive assembly 10 as illustrated includes at least one magnetic storage disk 12 typically having magnetic media on both upper and lower surfaces thereof. The disk 12 along with other components of the disk drive are contained within the housing 14. The disk 12 is mounted over a hub 16 which is driven by a motor (not shown) enabling the disk to rotate at high revolutions per minute during operation. An actuator assembly 18 is shown rotatably mounted to an actuator pivot 24. The actuator assembly extends along a longitudinal axis z—z. A load beam 22 connects to an actuator arm 23. A flexure 21 attaches to the load beam 22. In solid lines, the actuator assembly 18 is shown parked over the landing zone. The landing zone of the disk is allocated for takeoff and landing of the read/write heads during spin-up and spin-down of the disk. The actuator assembly 18 is rotated to a desired disk track by a voice coil motor shown as voice coil 26. Accordingly, the actuator assembly 18 moves in an arcuate path 25 across the disk and is positioned over the desired tracks during operation. Each of the disk tracks on the disk 12 are formed concentrically so that the arcuate movement of the actuator assembly results in the head moving substantially laterally or transversely with respect to the direction in which the tracks extend. The voice coil 26 is immersed in a magnetic field generated by magnet 28. An actuator control circuit (not shown) causes current flow in the voice coil motor 26 and ultimately controls the positioning of the actuator assembly by varying current through the voice coil. The dotted position of the actuator assembly 18 shows how the actuator may travel along path 25 by rotating about the actuator pivot point 24 in response to the voice coil motor 26. A flex cable 36 attaches to the actuator assembly which transfers electronic signals to and from a slider mounted to the flexure 21. The slider has one or more read/write heads.

Although a particular design is shown for the actuator assembly, it shall be understood that the micro-flexure of the present invention is not specifically limited by this design, and the micro-flexure is usable with many other designs.

Figure 2:
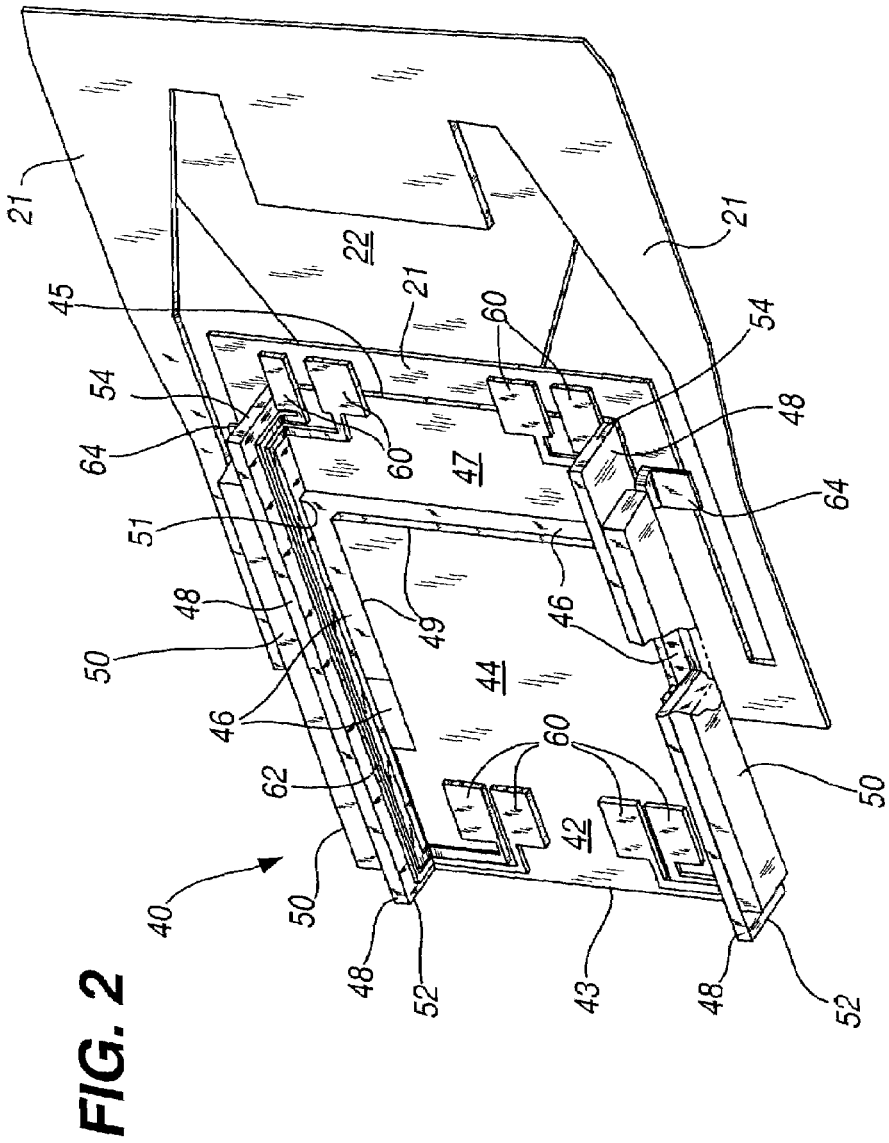
FIG. 2 is a perspective view of the micro-flexure of the present invention shown as mounted to a standard flexure.

FIG. 2 illustrates the micro-flexure 40 of the present invention attached to a standard flexure 21. FIG. 2 illustrates the side or face of the suspension 40 which normally faces the disk 12 during operation. The micro-flexure 40 includes a base section 42, and a tongue section 44 which extends from the base section 42 in a proximal direction and co-planar with the base section 42. Since the base section 42 and tongue section 44 are integrally formed on the same co-planar portion of the micro-flexure, they also may be collectively referred to as the slider carrying section. A u-shaped cutout defining a gap 46 is provided to allow separation between the peripheral edge 49 of the tongue section 49, the adjacent transverse support 47, and the adjacent edges of the pair of reinforcing legs 48. One reinforcing leg and piezoelectric element are broken away to illustrate the u-shaped gap 46. The reinforcing legs 48 each have a distal end 52 which terminates at or near a distal end 43 of the micro-flexure, and a proximal end 54 which terminates at or near a proximal end 45 of the micro-flexure. Also referring to FIG. 4, an offset or clearance is provided to separate the base section 42 and tongue section 44 from the flexure and the load beam, this clearance being denoted by clearance c. This clearance is formed by a step or extension 51 on each of the reinforcing legs 48. Steps 51 also separate sections 42 and 44 from the transverse support 47 that is attached to the standard flexure 21. For mechanical attachment of the micro-flexure to the standard flexure, this may be achieved by a weld or an adhesive joint at the transverse support 47. Electrically, the micro-flexure may be attached using ultrasonic wire-bonding, solder, conductive epoxy, or gold-ball bonding. The slider may be attached to the micro-flexure using known gold-ball bonding techniques.

The pair of piezoelectric elements 50 are attached along the exterior surfaces of reinforcing legs 48, and extend along a majority of the length of legs 48. Piezoelectric elements 50 may be attached to the exterior surfaces of legs 48 as by conductive adhesive, or other known techniques. Voltage is applied to the piezoelectric elements 50 through electrical bonding pads 64 formed on the transverse support 47. Elements 50 have one end in contact with the respective pads 64. Additional electrical connections are provided for attachment to slider 70, shown as electrical lead bonding pads 60 which are formed on both the transverse support 47 and base section 42. As shown, two pairs of lead pads 60 are formed on both the transverse support 47 and base section 42. A plurality of electrical leads 62 extend along the interior surfaces of reinforcing legs 48 and terminate at lead pads 60. Bonding pads 60 and 64 electrically connect to standard electrical leads (not shown) which extends proximally along the flexure to the actuator arm.

Figure 3:
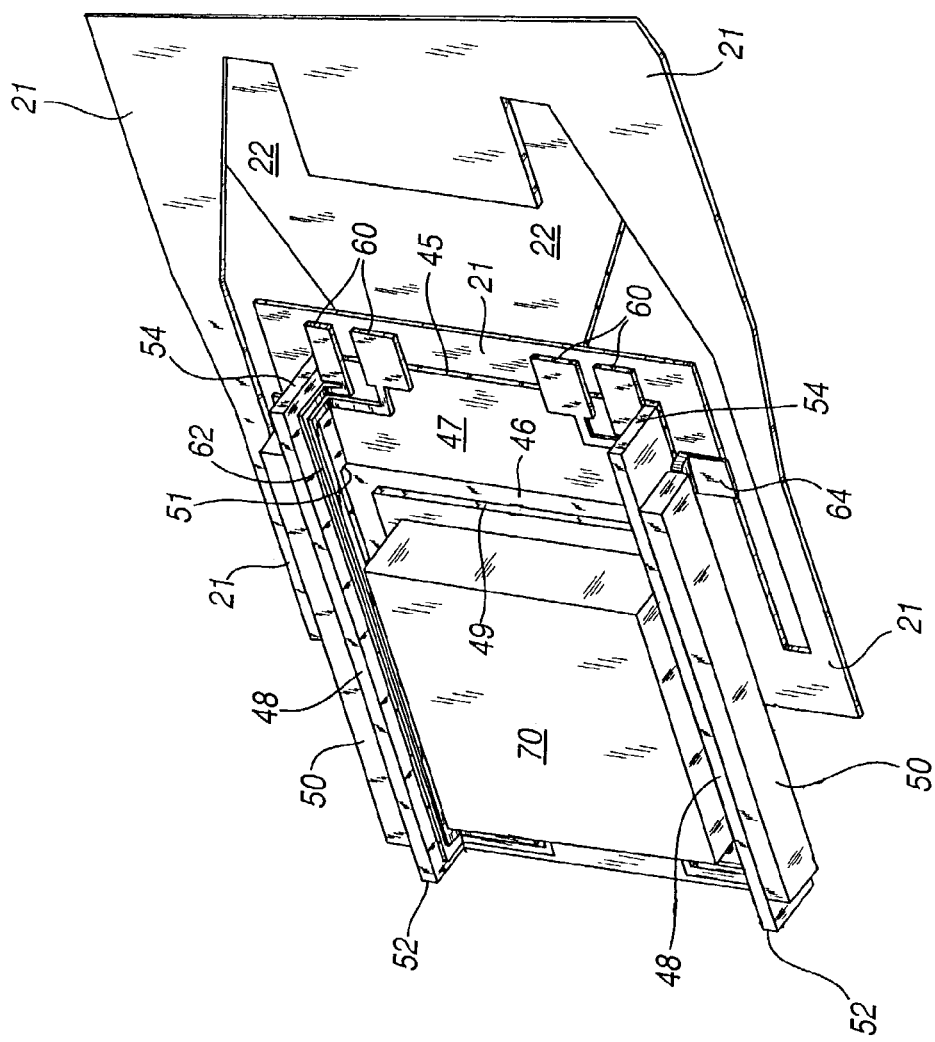
FIG. 3 is another perspective view of the micro-flexure of the present invention but further illustrating a slider mounted to the micro-flexure.
Figure 4:
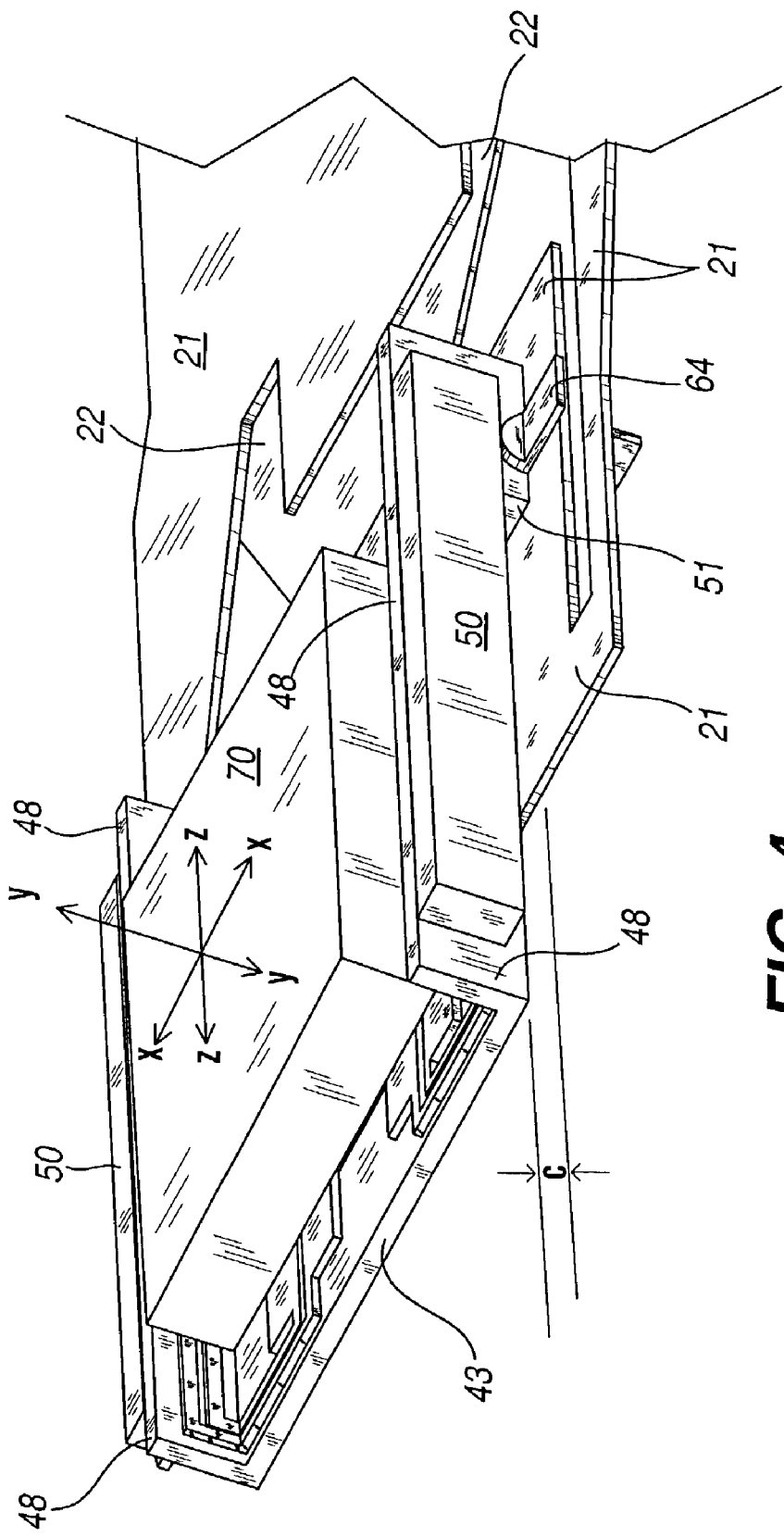
FIG. 4 is a greatly enlarged perspective view of the micro-flexure further illustrating details of the invention to include the clearance or spacing between the micro-flexure and the standard flexure.
Figure 5:
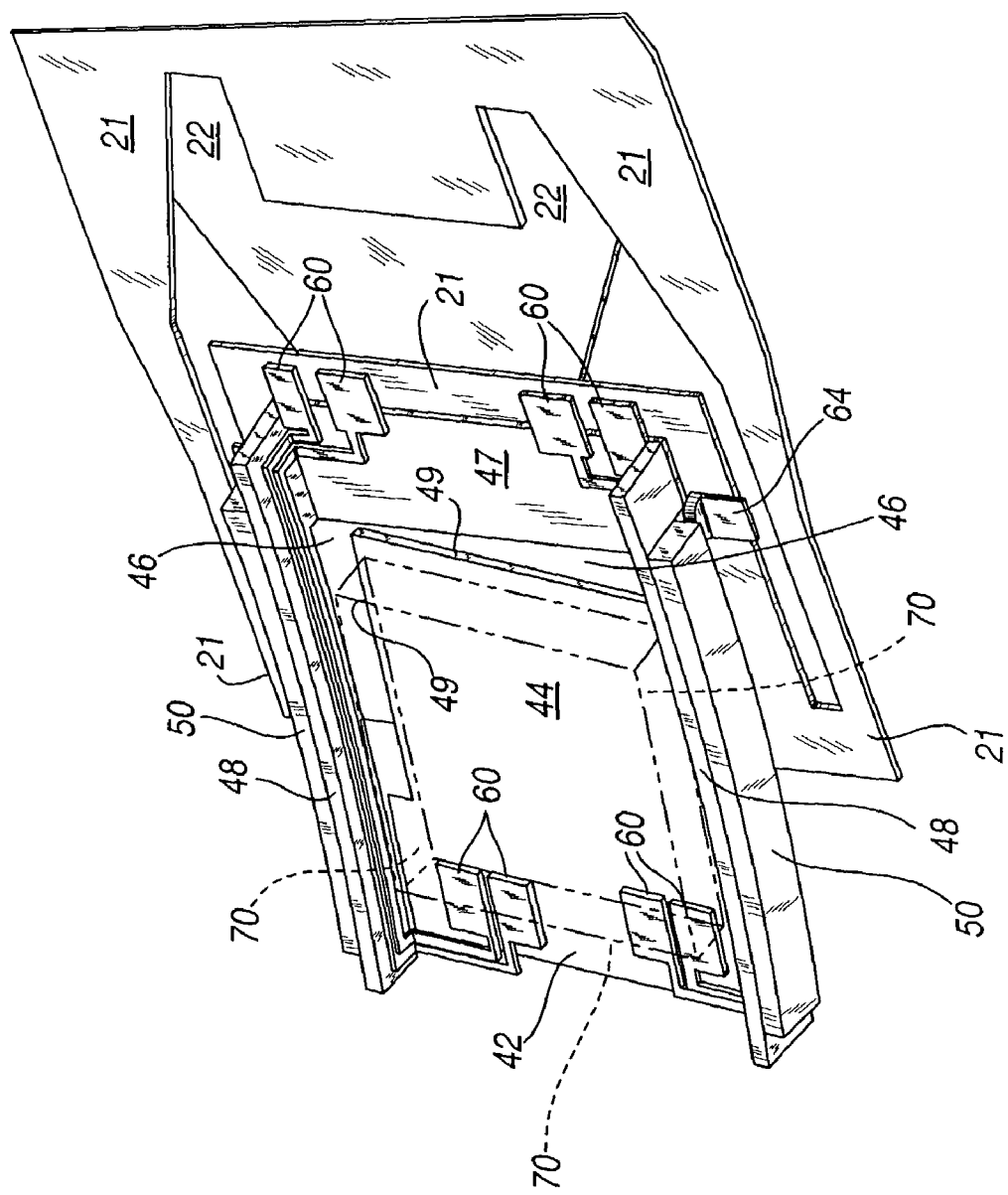
FIG. 5 is another perspective view of the micro-flexure illustrating how the micro-flexure imparts transverse or lateral displacement to the slider thereby achieving secondary actuation.

Now specifically referring to FIGS. 3–5, the slider 70 is shown attached to the base section 42 and tongue section 44 of the micro-flexure 40. A set of axis are provided on FIG. 4 to illustrate the x as well as y and z directions. When a desired voltage is applied to the piezoelectric elements 50, the piezoelectric elements will work in unison together to translate or shift the slider 70 in the transverse x direction by bending the legs 48 thereby providing fine positioning of the slider 70 on the desired track. Accordingly, reinforcing legs 48 that extend in the z direction will elastically deform or bend in the x direction in response to the expanding and shrinking experienced by the piezoelectric elements when the desired voltage is applied.

FIG. 5 illustrates an example of how the legs 48 elastically deform to facilitate the translation of the slider 70 in one direction. This deformation has been greatly exaggerated in this Figure in order to visualize the manner in which the slider 70 is moved for secondary actuation. If translation or movement is desired in the direction as shown, then contraction of one of the piezoelectric elements while expansion of the other piezoelectric element results in a uniform bending moment being placed on the reinforcing legs, thereby deforming the legs in the manner as shown. Of course, slider 70 can be displaced in the opposite x direction. By applying a voltage of opposite polarity, the piezoelectric elements can bend the legs 48 in the opposite x direction. The micro-flexure 40 maintains stiffness in the y direction to prevent inadvertent contact between the flexure 70 and the disk tracks because of the orientation of reinforcing legs 48. A much greater bending moment would have to be applied to the legs 48 in order to cause a deformation of the legs in the y direction. The height (extension in the y direction), length (extension in the z direction), and width (extension in the x direction) of the reinforcing legs 48 may be adjusted as necessary to provide the necessary stiffness in the y direction, yet still allow the piezoelectric elements to translate the slider 70 in the transverse or lateral x direction. Because of the offset defined by the clearance c between the standard flexure and the micro-flexure, even some undesirable amount of translation in the y direction will not result in interfering contact between the standard flexure and the micro-flexure. As shown in FIG. 5, gap 46 surrounding the peripheral edge 49 of the tongue section 44, also ensures that the slider 17 will not make interfering contact with the interior surfaces of reinforcing legs 48, even after secondary actuation.

The micro-flexure may be constructed of the same type of material as the standard flexure, such as a standard stainless steel, dielectric, copper, or cover layer suspension material.

The advantages of the present invention are clear. A simple yet effective micro-flexure is provided for secondary actuation of the actuator without having to substantially modify the structure of a standard flexure, load beam or any other components of an actuator. Accordingly, the micro-flexure may be incorporated within standard actuators without incurring the costs of complete retooling and redesign.

The configuration of the micro-flexure inhibits undesirable translation in a direction which may cause undesirable contact with the storage disk, yet allows precise translation of the slider in the desired transverse or lateral direction. Because of the small size and location of attachment of the micro-flexure, the adverse effects of windage excitation are minimized. Furthermore, the flight characteristics of the slider are not substantially affected because the structure of the micro-flexure does not modify the actual structure of the slider nor does it alter the slider's normal orientation with respect to the air bearing.

The design of the micro-flexure also enhances the shock and load carrying capability of the micro-flexure yet still provides a compliant lateral structure for secondary actuation. The reinforced construction along the y and z directions provide enhanced structural stability.

In many flexure designs, electrical leads may extend along very thin and unsupported portions of the flexure, or even some leads may extend along portions of the flexure that are separated from a main portion of the flexure and the leads are only supported by a weld or bond. These leads are sometimes referred to as "flying" leads. Because the electrical leads of the present invention are formed directly along the reinforcing legs, there are no "flying" leads thereby further enhancing the ability of the micro-flexure to withstand shock.

Because the micro-flexure can be manufactured as a separate element from the rest of the actuator, the micro-flexure may be tested separately. Therefore, proper functioning of the micro-flexure can be determined prior to assembly with the more expensive actuator.

The desired secondary actuation can be altered by adjusting either the size of the piezoelectric elements, and/or adjusting the size of the reinforcing legs which are manipulated during secondary actuation. These modifications can be done by simply enlarging or decreasing the size of the piezoelectric elements and reinforcing legs. Of course, the overall size of the micro-flexure may be adjusted to handle different sized sliders which are used on the various types of disk drives.

The present invention has been described with respect to a preferred embodiment; however, other changes and modifications can be made within the spirit and scope of the invention.

What is claimed is:

1. A micro-flexure for use in an actuator of a disk drive, said micro-flexure comprising:
    a base section forming a most distally extending portion of said micro-flexure;
    a tongue section extending proximally from said base section and said tongue section having a peripheral edge communicating with a gap formed in said micro-flexure;
    a pair of reinforcing legs formed on opposing lateral sides of said micro-flexure and having a height extending away from a common plane in which said base section and tongue section lie;
    a transverse support interconnecting adjacent ends of said pair of reinforcing legs;
    a pair of piezoelectric elements, one element of said pair of piezoelectric elements being mounted on each reinforcing leg of said pair of reinforcing legs;
    said tongue section and base section being offset from said transverse support by said gap that extends therebetween; and
    means attached to said micro-flexure for providing voltage to said pair of piezoelectric elements wherein a desired voltage applied to said piezoelectric elements causes deformation of said pair of reinforcing legs thereby providing movement of said micro-flexure in a transverse direction for secondary actuation.

2. A micro-flexure, as claimed in claim 1, wherein:
    said gap is u-shaped.

3. A micro-flexure, as claimed in claim 1, wherein:
    said height of said reinforcing legs extends substantially perpendicular to said common plane of said base and tongue sections.

4. A micro-flexure, as claimed in claim 1, wherein:
    said piezoelectric elements attach to respective exterior surfaces of said reinforcing legs.

5. A micro-flexure, as claimed in claim 1, wherein:
    said reinforcing legs are elastically bent in the transverse direction by a bending moment induced thereon by the pair of piezoelectric elements.

6. A micro-flexure, as claimed in claim 1, wherein:
    said pair of reinforcing legs have a length extending substantially parallel to a longitudinal axis of the actuator.

7. A micro-flexure for use in an actuator of a disk drive, said micro-flexure comprising:
    a slider carrying section having a peripheral edge communicating with a gap formed in said micro-flexure;
    a pair of reinforcing legs formed on opposing lateral sides of said micro-flexure, said pair of reinforcing legs having a length extending along a longitudinal axis of the actuator, and said pair of reinforcing legs having a height extending substantially perpendicular to a plane in which said slider carrying section lies;
    a transverse support interconnecting proximal ends of said pair of reinforcing legs, said slider carrying section being offset from said transverse support by said gap extending therebetween;
    said slider carrying section interconnecting distal ends of said pair of reinforcing legs; and
    a pair of piezoelectric elements, one element of said piezoelectric elements being mounted on each reinforcing leg of said pair of reinforcing legs.

8. A micro-flexure, as claimed in claim 7, wherein:
said gap is u-shaped.

9. A micro-flexure, as claimed in claim 7, wherein:
said piezoelectric elements attach to respective exterior surfaces of said reinforcing legs.

10. A micro-flexure, as claimed in claim 7, wherein:
said reinforcing legs are elastically bent in a transverse direction by a bending moment induced thereon by the pair of piezoelectric elements; and
said pair of reinforcing legs having a length extending substantially parallel to a longitudinal axis of the actuator.

11. A micro-flexure suspension assembly for use in an actuator of a disk drive, said micro-flexure suspension assembly comprising:
a load beam;
a standard flexure attached to said load beam, said load beam providing a load upon said standard flexure to maintain said standard flexure at a predetermined and desired height with respect to a magnetic disk of the disk drive;
a micro-flexure attached to said standard flexure, said micro-flexure including:
(i) a base section;
(ii) a tongue section extending from said base section and said tongue section having a peripheral edge communicating with a gap formed in said micro-flexure;
(iii) a pair of reinforcing legs formed on opposing lateral sides of said micro-flexure and extending away from a common plane in which said base section and tongue section lie;
(iv) a transverse support interconnecting adjacent ends of said pair of reinforcing legs;
(v) a pair of piezoelectric elements, one element of said pair of piezoelectric elements being mounted on each reinforcing leg of said pair of reinforcing legs;
(vi) said tongue section and base section being offset from said transverse support; and
(vii) means attached to said micro-flexure for providing voltage to said pair of piezoelectric elements wherein a desired voltage applied to said piezoelectric elements causes deformation of said pair of reinforcing legs thereby providing movement of said micro-flexure in a lateral/transverse direction for secondary actuation.

12. An assembly, as claimed in claim 11, wherein:
said gap is u-shaped.

13. An assembly, as claimed in claim 11, wherein:
said reinforcing legs have a height extending substantially perpendicular to said common plane of said base and tongue sections.

14. An assembly, as claimed in claim 11, wherein:
said piezoelectric elements attach to respective exterior surfaces of said reinforcing legs.

15. A method of providing secondary actuation for an actuator of a disk drive, said method comprising the steps of:
providing a standard flexure which attaches to a load beam of the actuator, said actuator being movable for primary actuation along a desired track of a magnetic storage disk;
providing a micro-flexure, said micro-flexure having a stationary portion attached to said standard flexure, and a movable portion spaced and offset from the stationary portion thereby providing clearance for secondary actuation, said movable portion including at least one reinforcing leg having a length extending substantially parallel to a longitudinal axis of the actuator;
providing a slider attached to said micro-flexure;
providing at least one piezoelectric element mounted to said at least one reinforcing leg; and
applying a desired voltage to said at least one piezoelectric element thereby causing said piezoelectric element to deform thereby imparting a desired transverse movement upon said movable portion with respect to said standard flexure, wherein said movement provides fine positioning for secondary actuation of the slider on the desired track of the magnetic storage disk.

16. A micro-flexure suspension assembly for providing secondary actuation in an actuator of a disk drive, said micro-flexure suspension assembly comprising:
a load beam;
a standard flexure attached to said load beam, said load beam providing a load upon said standard flexure to maintain said standard flexure at a predetermined and desired spacing with respect to a magnetic disk of the disk drive;
a micro-flexure attached to said standard flexure, said micro-flexure including:
(i) a stationary portion attached to said standard flexure;
(ii) a movable portion offset from said standard flexure, and spaced from said stationary portion by a gap, said movable portion including a base section, a tongue section extending from the base section, and a pair of reinforcing legs formed on opposite lateral sides of said micro-flexure; and
(iii) means for laterally displacing said movable portion in response to a selected voltage applied to said means for laterally displacing, wherein lateral displacement of said movable portion results in a desired secondary actuation.

17. An assembly, as claimed in claim 16, further including:
a slider attached to said movable portion.

18. An assembly, as claimed in claim 16, further including:
a slider attached to said base and tongue sections and positioned between said pair of reinforcing legs.

19. A micro-flexure for use in an actuator of a disk drive, said micro-flexure comprising:
a slider carrying section having a base section forming a most distally extending portion of said micro-flexure, and a tongue section extending proximally from said base section and having a peripheral edge communicating with a gap formed in said micro-flexure;
means formed on opposing lateral sides of said micro-flexure for providing stiffening support to said micro-flexure and for facilitating transverse movement of said micro-flexure during secondary actuation; and
a plurality of piezoelectric elements attached to said means for providing stiffening and for facilitating transverse movement, wherein a voltage applied to said plurality of piezoelectric elements causes deformation of said means for providing stiffening and for facilitating transverse movement thereby providing movement of said micro-flexure in a transverse direction for secondary actuation.

20. A micro-flexure suspension assembly for use in an actuator of a disk drive, said micro-flexure suspension assembly comprising:
a load beam;
a standard flexure attached to said load beam;

a micro-flexure attached to said standard flexure, said micro-flexure including:
  (i) a slider carrying section having a peripheral edge communicating with a gap formed in said micro-flexure;
  (ii) means formed on opposing lateral sides of said micro-flexure for providing stiffening support to said micro-flexure and for facilitating transverse movement of said micro-flexure during secondary actuation;
  (iii) a plurality of piezoelectric elements attached to said means for providing stiffening and for facilitating transverse movement, wherein a voltage applied to said plurality of piezoelectric elements causes deformation of said means for providing stiffening and for facilitating transverse movement thereby providing movement of said micro-flexure in a transverse direction for secondary actuation; and
a slider mounted to said micro-flexure.

21. A micro-flexure suspension assembly for use in an actuator of a disk drive, said micro-flexure suspension assembly comprising:
  a load beam;
  a standard flexure attached to said load beam;
  a micro-flexure having proximal and distal ends, said proximal end connected to said standard flexure, said micro-flexure including:
    (i) a slider carrying section having a peripheral edge communicating with a gap formed in said micro-flexure;
    (ii) a pair of reinforcing legs formed on opposing lateral sides of said micro-flexure, said legs extending substantially parallel to a longitudinal axis of the actuator and having a height extending substantially perpendicular to a plane in which said slider carrying section lies; and
    (iii) a pair of piezoelectric elements, one element of said piezoelectric elements being mounted on each reinforcing leg of said of reinforcing legs.

22. A micro-flexure suspension assembly, as claimed in claim 21, wherein:
  said micro-flexure further includes a transverse support interconnecting proximal ends of said pair of reinforcing legs.

23. A micro-flexure suspension assembly, as claimed in claim 21, wherein:
  said gap is u-shaped.

24. A micro-flexure suspension assembly, as claimed in claim 21, wherein:
  said reinforcing legs are elastically bent in a transverse direction by a bending moment induced thereon by the pair of piezoelectric elements.

25. A micro-flexure suspension assembly for providing secondary actuation in an actuator of a disk drive, said micro-flexure suspension assembly comprising:
  a load beam;
  a standard flexure attached to said load beam, said load beam providing a load upon said standard flexure to maintain said standard flexure at a predetermined and desired spacing with respect to a magnetic disk of the disk drive;
  a micro-flexure attached to said standard flexure, said micro-flexure including:
    (i) a stationary portion attached to said standard flexure;
    (ii) a movable portion offset from said standard flexure, and spaced from said stationary portion by a gap;
    (iii) means for laterally displacing said movable portion in response to a selected voltage applied to said means for laterally displacing, wherein lateral displacement of said movable portion results in a desired secondary actuation; and
  wherein said movable portion further includes a pair of reinforcing legs, and said means for laterally displacing further includes a pair of piezoelectric elements attached to corresponding exterior surfaces of said pair of reinforcing legs.

26. An assembly, as claimed in claim 25, wherein:
  said movable portion includes a tongue section, and said gap surrounds a peripheral edge of said tongue section.

27. A micro-flexure suspension assembly for providing secondary actuation in an actuator of a disk drive, said micro-flexure suspension assembly comprising:
  a load beam;
  a standard flexure attached to said load beam, said load beam providing a load upon said standard flexure to maintain said standard flexure at a predetermined and desired spacing with respect to a magnetic disk of the disk drive;
  a micro-flexure attached to said standard flexure, said micro-flexure including:
    (i) a stationary portion attached to said standard flexure;
    (ii) a movable portion offset from said standard flexure, and spaced from said stationary portion by a gap; and
    (iii) means for laterally displacing said movable portion in response to a selected voltage applied to said means for laterally displacing, wherein lateral displacement of said movable portion results in a desired secondary actuation; and
  a slider attached to said base and tongue sections and positioned between said pair of reinforcing legs.

* * * * *